United States Patent
Cazangi

(10) Patent No.: US 11,731,278 B1
(45) Date of Patent: Aug. 22, 2023

(54) ROBOT TELEOPERATION USING MOBILE DEVICE MOTION SENSORS AND WEB STANDARDS

(71) Applicant: X Development LLC, Mountain View, CA (US)

(72) Inventor: Renato Cazangi, Mountain View, CA (US)

(73) Assignee: Google LLC, Mountain View, CA (US)

(*) Notice: Subject to any disclaimer, the term of this patent is extended or adjusted under 35 U.S.C. 154(b) by 401 days.

(21) Appl. No.: 16/853,627

(22) Filed: Apr. 20, 2020

(51) Int. Cl.
*B25J 9/16* (2006.01)
*B25J 5/00* (2006.01)

(52) U.S. Cl.
CPC ............ *B25J 9/1689* (2013.01); *B25J 9/161* (2013.01); *B25J 9/1656* (2013.01); *B25J 5/007* (2013.01)

(58) Field of Classification Search
CPC ........ B25J 9/1689; B25J 9/161; B25J 9/1656; B25J 5/007
See application file for complete search history.

(56) References Cited

U.S. PATENT DOCUMENTS

| | | | | |
|---|---|---|---|---|
| 8,150,384 B2* | 4/2012 | Abifaker | ................ | H04W 4/21 455/418 |
| 9,007,304 B2* | 4/2015 | Bevilacqua | ......... | G06F 3/04883 345/158 |
| 9,025,856 B2* | 5/2015 | Ramachandran | ...... | B25J 9/1697 382/153 |
| 9,052,710 B1* | 6/2015 | Farwell | .................. | B25J 9/1656 |
| 9,776,332 B2* | 10/2017 | Oh | ........................ | G05D 1/0033 |
| 9,895,809 B1* | 2/2018 | Moore | .................. | B25J 13/006 |
| 10,291,765 B2* | 5/2019 | So | ............................. | H04Q 9/00 |
| 2018/0052451 A1* | 2/2018 | Billi-Duran | ...... | G05B 19/41835 |
| 2022/0019213 A1* | 1/2022 | Haghighat Kashani | .................... | B60R 25/01 |

OTHER PUBLICATIONS

Mandlekar et al., "ROBOTURK: A Crowdsourcing Platform for Robotic Skill Learning through Imitation," Nov. 7, 2018, Department of Computer Science, Stanford University (Year: 2018).*

(Continued)

*Primary Examiner* — Jonathan L Sample
*Assistant Examiner* — Elizabeth Rose Neleski
(74) *Attorney, Agent, or Firm* — McDonnell Boehnen Hulbert & Berghoff LLP

(57) ABSTRACT

A method includes receiving an indication that a web-based application has been accessed for control of a robotic device by a mobile device, wherein the mobile device comprises one or more sensors to detect movement of the mobile device. The method further includes subscribing the web-based application to at least one motion event web API, wherein the at least one motion event web API listens normalizes motion data from the one or more sensors of the mobile device into one or more standardized motion parameters. The method additionally includes receiving the one or more standardized motion parameters of the mobile device from the at least one motion event web API. The method further includes converting the one or more standardized motion parameters into one or more requested movement commands for the robotic device. The method further includes sending the one or more requested movement commands to the robotic device.

20 Claims, 11 Drawing Sheets

(56) References Cited

OTHER PUBLICATIONS

MDN Web Docs, Mozilla Foundation, https://developer.mozilla.org/en-US/docs/Web, Archived Pages, 2018-Jan. 2020 (Year: 2020).*

Bernhardt et al., "Project 4: iPhone-Controlled Robotic Projects," 2011 Smarter Program Project Archive, http://engineering.nyu.edu/mechatronics/smart/html/projects/projects11.html, 2010, 2 pp. (accessed Apr. 20, 2020).

Bernhardt et al., "iPhone Controlled Robots," NYU:poly, 2011, 36 pp.

Frank et al., "Illustrative videos for monitoring, commanding, and controlling laboratory testbeds using iPhone, iPod, and iPad over an ad hoc Wi-Fi network," Smarter Videos of iPod Controlled Lab Experiments, http://engineering.nyu.edu/mechatronics/smart/iphone_LabExp_videos.html, 2020, 6 pp. (accessed Apr. 20, 2020).

Wu, Shandong, "Remote Robot Control Using Intelligent Handheld Devices," IEEE Conference Paper, Oct. 2004, 7 pages.

* cited by examiner

ROBOT TELEOPERATION USING MOBILE DEVICE MOTION SENSORS AND WEB STANDARDS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a web-based application for controlling a robotic device through a mobile device that comprises motion sensors. A human operator may use a mobile device to open the web-based application for operation of a robotic device. The web-based application may subscribe to at least one motion event web application programming interface (API) that listens for motion data from the motion sensors of the mobile device. The motion event web API may receive motion data from the mobile device and normalize it into standardized motion parameters. The web-based application may receive the standardized motion parameters and convert them into requested movement commands to send to the robotic device.

In an embodiment, a method includes receiving an indication that a web-based application has been accessed for control of a robotic device by an internet browser running on a mobile device, wherein the mobile device comprises one or more sensors to detect movement of the mobile device. The method further includes, after receiving the indication, subscribing the web-based application to at least one motion event web application programming interface (API), wherein the at least one motion event web API listens for motion data from the one or more sensors of the mobile device and normalizes the motion data into one or more standardized motion parameters. The method additionally includes, when a motion event is detected by the at least one motion event web API, receiving, by the web-based application, the one or more standardized motion parameters of the mobile device from the at least one motion event web API. The method further includes converting, by the web-based application, the one or more standardized motion parameters into one or more requested movement commands for the robotic device. The method additionally includes sending, by the web-based application, the one or more requested movement commands to the robotic device.

In a further embodiment, a non-transitory computer readable medium is provided which includes programming instructions executable by at least one processor to cause the at least one processor to perform functions. The functions include receiving an indication that a web-based application has been accessed for control of a robotic device by an internet browser running on a mobile device, wherein the mobile device comprises one or more sensors to detect movement of the mobile device. The functions further include, after receiving the indication, subscribing the web-based application to at least one motion event web application programming interface (API), wherein the at least one motion event web API listens for motion data from the one or more sensors of the mobile device and normalizes the motion data into one or more standardized motion parameters. The functions additionally include, when a motion event is detected by the at least one motion event web API, receiving, by the web-based application, the one or more standardized motion parameters of the mobile device from the at least one motion event web API. The functions further include converting, by the web-based application, the one or more standardized motion parameters into one or more requested movement commands for the robotic device. The functions additionally include sending, by the web-based application, the one or more requested movement commands to the robotic device.

In another embodiment, a system is provided that includes means for receiving an indication that a web-based application has been accessed for control of a robotic device by an internet browser running on a mobile device, wherein the mobile device comprises one or more sensors to detect movement of the mobile device. The system further includes means for, after receiving the indication, subscribing the web-based application to at least one motion event web application programming interface (API), wherein the at least one motion event web API listens for motion data from the one or more sensors of the mobile device and normalizes the motion data into one or more standardized motion parameters. The system additionally includes, when a motion event is detected by the at least one motion event web API, receiving, by the web-based application, the one or more standardized motion parameters of the mobile device from the at least one motion event web API. The system further includes converting, by the web-based application, the one or more standardized motion parameters into one or more requested movement commands for the robotic device. The system additionally includes sending, by the web-based application, the one or more requested movement commands to the robotic device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
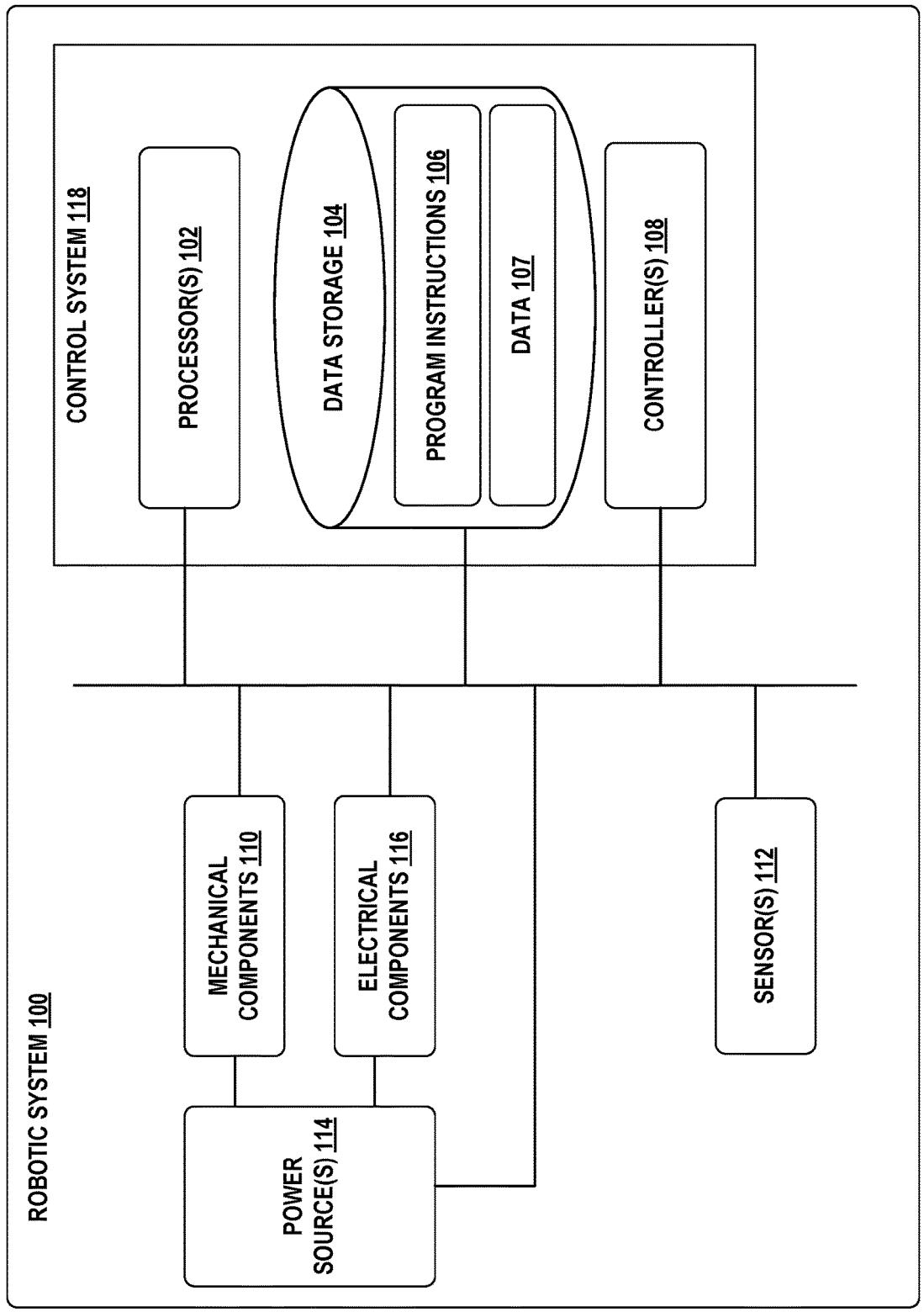
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

For situations in which a robotic control system is unable to operate or would be error-prone without human assistance, robot teleoperation may be helpful. However, robot teleoperation from a stationary computer can be cumbersome. For example, the user may be stuck behind a desktop computer and cannot follow the robot as it moves to different locations. Robot teleoperation with a laptop computer may bring more freedom in movement for the user, but it is still limiting as it requires carrying around the laptop. Small mobile devices, such as smartphone or tablet computers, may be useful for portable teleoperation control, especially smartphones as many users would likely already have one with them.

A small mobile device may be limited in input interfaces due to the limited size of touchscreens and/or keyboards. However, most small mobile devices also include motion sensors that can be used for user inputs. Many applications, such as mobile games, utilize motion controls as user input. For example, a vehicle racing game may have the user tilt the mobile device left and right to mimic a steering wheel to control a vehicle in the game. Similar motion inputs can be beneficial for robot teleoperation by enabling users to closely mimic desired motions for the robotic device to execute. However, the motion sensors of different types or brands of mobile devices may operate differently from each other. Additionally, different types and brands of mobile devices may have varying types of operating systems. These can be limitations for implementing robot teleoperation using mobile devices because an application may only be able to work on certain types or brands of mobile devices. Further, even if the native application is compatible with the mobile device, it would require to be installed locally on the mobile device and be periodically updated as the application is improved. However, since the majority of mobile devices contain an internet browser application, a web-based application may be able to overcome implementation limitations.

Example implementations may relate to methods and systems for controlling a robotic device through motion of a mobile device by way of a web-based application. In particular, a user may access a web-based application through an internet browser. The user may then rotate or pivot a mobile device about a local motion frame while one or more motion sensors, such as a gyroscope or accelerometer, track the motion data. In this context, a motion sensor provides sensor data for local motion sensing rather than geographic motion sensing (e.g., moving in terms of latitude and longitude via GPS). The web-based application may be configured to receive the movements of a mobile device through at least one web application programming interface (API) that normalizes the motion data into standardized motion parameters to be translated into movement commands to send to the robotic device. This may allow robot teleoperation to be conducted through any mobile device that contains motion sensors and access to an internet browser.

To begin teleoperation of a robotic device, a user may use an internet browser to access the web-based application. This may cause the web-based application to subscribe to at least one motion event web API that is configured to listen for motions of the mobile device that is accessing the web-based application. Each motion event web API may then normalize the motion data into standardized motion parameters such that no matter what operating system or type of motion sensors the mobile device uses, the resulting motion parameters are configured into the same standard. The standardized motion parameters may then be sent to the web-based application where the web-based application may refine the standardized motion parameters, such as by removing or cleaning up irrelevant and noisy data points. The web-based application may then convert the standardized motion parameters into requested movement commands that are configured to be compatible with the robotic device the user is controlling. Finally, the requested movement commands may then be sent to the robotic device to be executed.

Example implementations may include a robotic device comprising internet access capabilities. The robotic device may also use internal network access capabilities such as intranet access capabilities as well or instead. The robotic device may be configured to receive requested movement commands through an internet connection from the web-based application. In some implementations, the robotic device may be configured to receive the requested movement commands through a Websocket connection protocol. In other implementations, the robotic device may be configured to receive the requested movement commands from cloud-hosted data storage, such as via push notifications, by subscribing to receive changes in the cloud-hosted data storage, or polling the cloud-based data storage at a given frequency. The robotic device may be further configured to send feedback data describing the results of the execution of the requested movement commands.

In some implementations, there may be more than one robotic device that is configured to receive requested movement commands. In further implementations, each robotic device may be configured to output a code for the user to input into the web-based application in order to validate the mobile device that is attempting to access control for the robotic device. For instance, the robotic device may display the code on a screen on the robotic device or provide an auditory output from a speaker in the robotic device. This can ensure that the user's mobile device does not control a robotic device the user does not have access to.

In some implementations, the robotic device may include multiple components that are each configured to execute requested movement commands. The multiple components may have varying degrees of freedom. In some implementations, the robotic device may have a base comprising wheels that move the robotic device around the environment. The requested movement commands for the robotic device's base may include commands such as move forward, turn right, turn left, or reverse. In some implementations, the robotic device may have an appendage such as an arm. In further implementations, the arm may have a gripper. The requested movement commands for a robotic device's arm may include commands such as lift arm, lower arm, close gripper, or open gripper. In some implementations, the robotic device may include a head with perception sensors. The requested movement commands for the robotic device's head may include commands such as tilt head upward, tilt head downward, rotate right, or rotate left.

Example implementations may include a mobile device, such as a mobile phone, configured to access the web-based application through an internet browser interface. The mobile device may include one or more sensors that track the movement of the mobile device. The one or more motion sensors may include a gyroscope and/or an accelerometer. The movement of the mobile device may include translational movement and rotational movement in three-dimensional (3D) space about a local motion frame. The mobile device may also include external buttons that can be configured to be used as an input while using the web-based application. The mobile device may also include a touchscreen that can be configured to be used as an input while using the web-based application. In some implementations, the web-based application may require a touch-based input from the user in order to send the requested movement commands, wherein the touch-based input is a press-and-hold actuation from the user. In some of these implementations, the press-and-hold actuation may be done on an external button of the mobile device. In other implementations, the press-and-hold actuation may be done on the touchscreen. In these implementations, releasing the press-and-hold actuation may cause the web-based application to stop sending requested movement commands to the robotic device. This may prevent unnecessary or unintentional movement commands to be sent to the robotic device, such as when the user moves the mobile device in order to put the mobile device down.

In some cases, requested movement commands may fail to be executed, such as due to an obstacle in the environment or when a movement is beyond the robotic device's capabilities. In some implementations, the mobile device may also include vibration feedback capabilities and the web-based application may use a vibration web API to cause the mobile device to vibrate as feedback for when a requested movement command has failed or is going to fail.

Example implementations may include a graphical user interface (GUI) for the web-based application. The GUI may be configured to display a list of robotic device identifiers. The identifiers may be associated with robotic devices for which the web-based application is configured to translate standardized motion parameters into compatible requested movement commands and that are available to receive requested movement commands from the web-based application. The user may then select a robotic device identifier from the list to control. The GUI may further be configured to display a list of component identifiers, wherein the identifiers are associated with components of the selected robotic device for which the web-based application is configured to translate standardized motion parameters into compatible requested movement commands and that can receive the requested movement commands. The user may then select a component identifier from the list to control. The GUI may have different configurations for different types of components of a robotic device. For example, the GUI displayed when controlling a robotic arm may be configured differently than the GUI displayed when controlling a robotic gripper. In some implementations, if the controlled component comprises a visual sensor, a live feed of the data from the visual sensor may be displayed on the GUI, such as video or an image stream. In some implementations, the user may be able to switch between which component is currently being controlled by reselecting from the list of component identifiers.

In example implementations, the web-based application may receive an indication that the web-based application has been accessed for control of a robotic device through an internet browser of a mobile device. In some implementations, the indication may be sent when a user has opened the web-based application in an internet browser of a mobile device. In other implementations, the indication may be sent when a user selects a robotic device from a plurality of robotic device identifiers for which the web-based application is configured to translate standardized motion parameters into compatible requested movement commands and that are available at the time to receive the requested movement commands. In other implementations, the indication may be sent when a user selects a component from one or more of components of the robotic device for which the web-based application is configured to translate standardized motion parameters into compatible requested movement commands. The web-based application may be further configured with a method to validate that the mobile device attempting to control the robotic device can be allowed for control. In such implementations, the selected robotic device may be configured to output a code for a user to enter into the web-based application, such as displayed on a screen on the robotic device or as an auditory output from a speaker in the robotic device. In additional implementations, the selected robotic device may output the code to the user via a text message sent to the mobile device as well or instead. In further such implementations, the web-based application may be configured to accept a user input and compare the user input to the code the robotic device outputted.

Further, the web-based application may, in response to the received indication, subscribe to at least one motion event web API which listens for motion data from one or more sensors of the mobile device and normalizes the motion data into one or more standardized motion parameters. The motion event web APIs may receive motion data representing tracked motion of the mobile device. The motion event web APIs may include a first motion event web API that reads the orientation of the mobile device. This motion event web API may express the orientation of the mobile device as a series of rotations from a local coordinate frame. For example, an x-axis and a y-axis may be in the plane parallel to the mobile device and a z-axis may be in the plane perpendicular to the mobile device. In this example, tilting the mobile device to the right may be read as rotating the mobile device around the y-axis and be represented by a variable that expresses the amount of degrees by which the mobile device rotated around the y-axis. The motion event web APIs may also include a second motion event web API that reads acceleration of the mobile device as well or instead. The acceleration may represent speed of changes in the device's position and/or orientation. This motion event web API may express the acceleration in Cartesian coordinates in a coordinate frame defined in the device. This motion event web API may also read the rotation rate of the mobile device about a local coordinate frame. Additional types of motion event web APIs may be used as well or instead. As another example, a motion event web API may measure translations in addition to or instead of rotations. Motion data may be normalized by the motion event web APIs into standardized motion parameters and sent to the web-based application. This may allow the web-based application to be compatible with various types of mobile devices because the resulting standardized motion parameters will be configured to the same standard no matter the operating system or motion sensors of the mobile device.

Further, the web-based application may be configured to receive the one or more standardized motion parameters from the motion event web APIs. The one or more standardized motion parameters may be refined by the web-based application. The refining process may include combining the standardized motion parameters from multiple motion event web APIs into a single object. The refining process may also include removing readings that are too small, such as rotations smaller than 10 degrees, or movements smaller than 10 percent of the full range of the robotic device. The refining process may further include limiting rotation parameters based on operational limits of the robotic device. The refining process may further include normalizing all the readings. The web-based application may then convert the one or more standardized motion parameters into one or more requested movement commands for the robotic device. The conversion may be configured differently depending on which robotic device the web-based application is connected to and/or what component of the robotic device the user has selected to control. For example, the translation for requested movement commands for a robotic arm may differ from the translation for requested movement commands for the wheels of a robotic base. Additional refining may be done to the requested movement commands. The additional refining process may include discarding commands if the parameters are identical to the last ones sent to the robotic device. The additional refining process may further include debouncing the requested movement commands, such as discarding commands that are issued at a higher frequency than an arbitrary maximum threshold. Finally, the web-based application may be configured to send the requested movement commands to the connected robotic device.

In some implementations, the requested movement commands may be sent through a Websocket connection protocol to the robotic device. In other implementations, the requested movement commands may be sent to cloud-hosted data storage, such as a cloud-hosted database. The robotic device may be configured to subscribe to the cloud-hosted data storage such that when the requested movement commands are added to the cloud-hosted data storage, the robotic device receives them. In some implementations, the web-based application may be configured to receive feedback from the robotic device such that the web-based application is notified if a requested movement command could not or cannot be executed. In further implementations, the web-based application may be configured to use a vibration web API by sending an indication to the vibration web API when the execution of a requested movement command has failed in order to cause the mobile device to vibrate as feedback.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
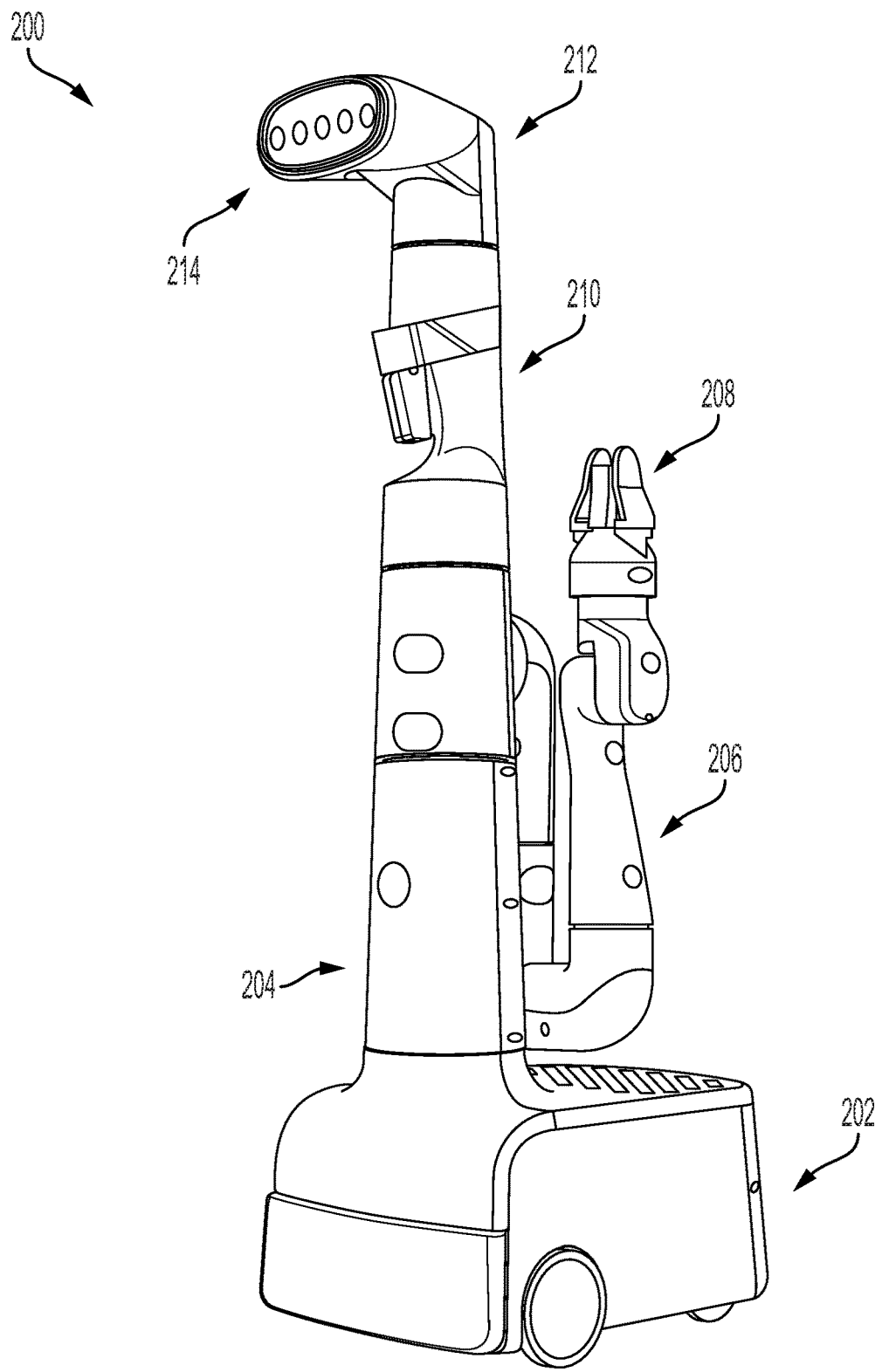
FIG. 2 illustrates a mobile robot, in accordance with example embodiments.
Figure 3:
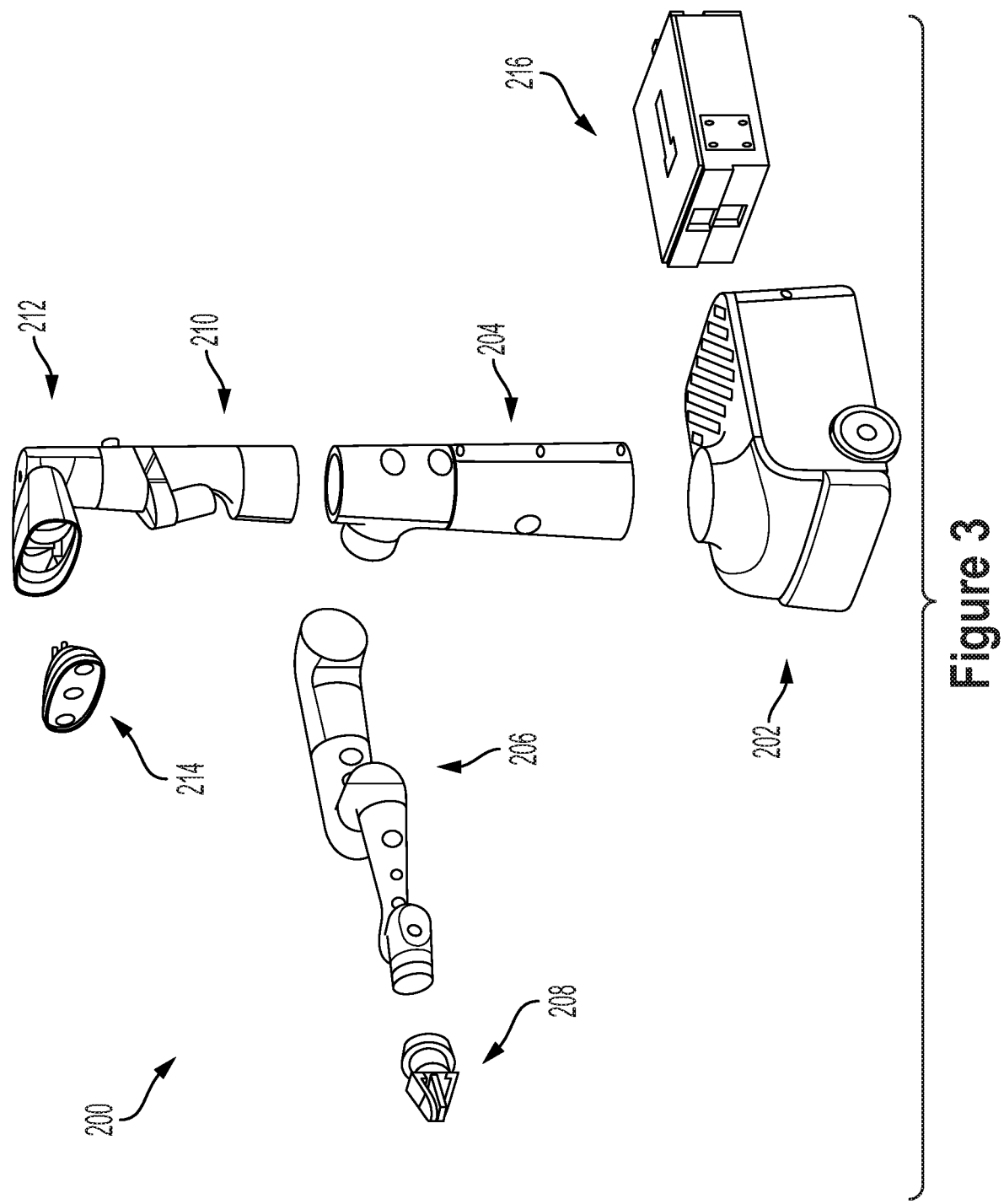
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
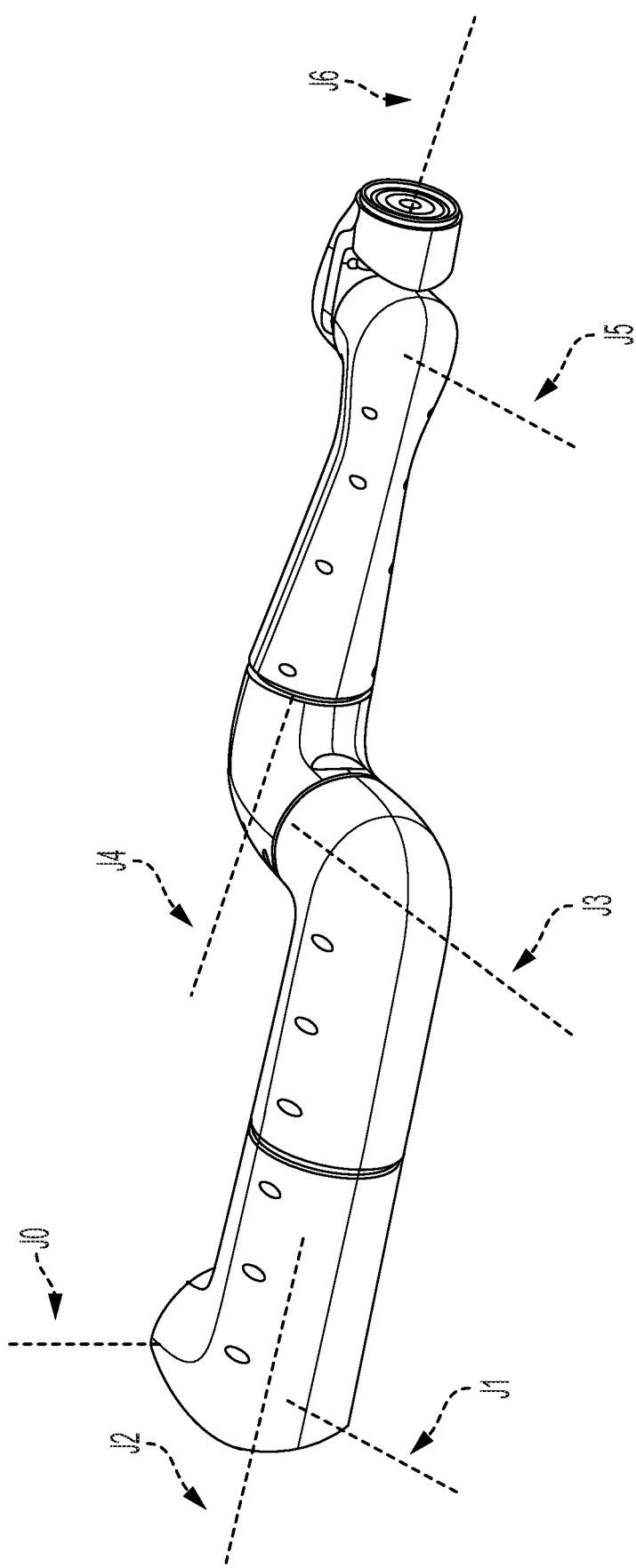
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5A:
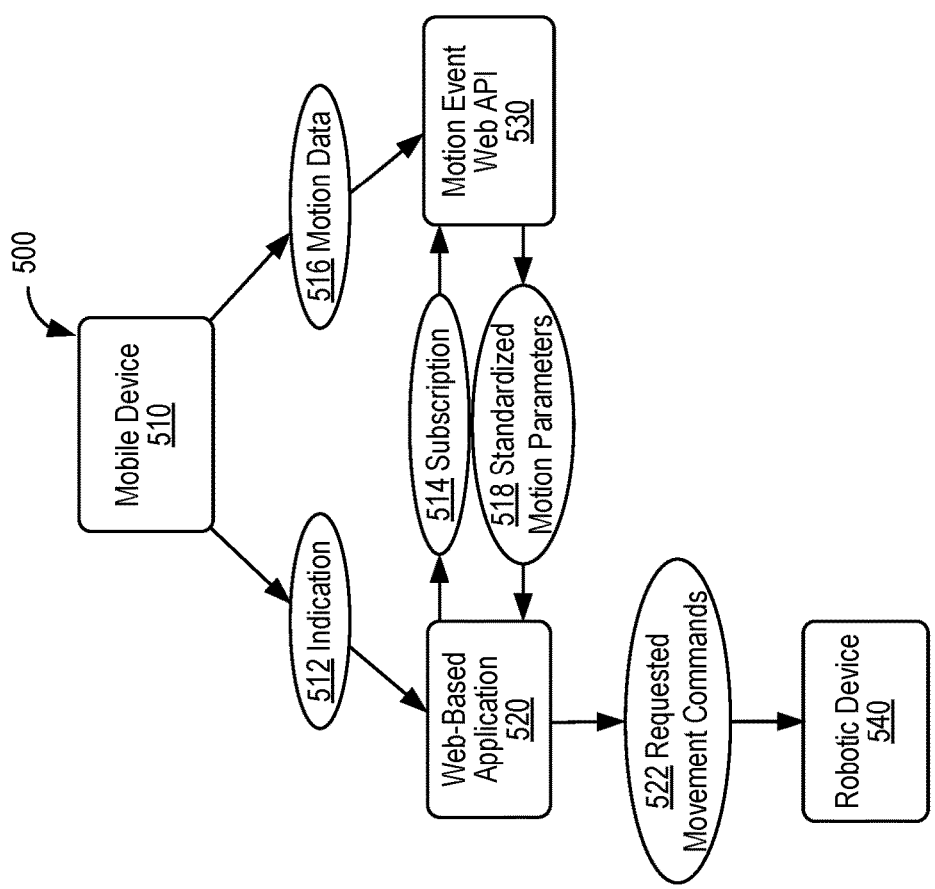
FIG. 5A illustrates an information flow diagram, in accordance with example embodiments.

FIG. 5A is an information flow diagram, in accordance with example embodiments. More specifically, FIG. 5A illustrates an example pipeline 500 that may be utilized by a robot controller, that may be similar to control system 118 of the robotic system 100, and a mobile device in order to remotely operate the robotic device through a web-based application. In some examples, the robotic device may be the robotic device illustrated and described with respect to FIGS. 1-4. The pipeline 500 may also be employed by robotic devices with different form factors as well. In further examples, one or more of the blocks may be omitted or combined and/or one or more additional blocks may be added.

Block 510 represents a mobile device. The mobile device may include one or more motion sensors that detect and track the movement of the mobile device in three dimensional (3D) space. The mobile device may also have access to an internet browser.

Block 520 represents a web-based application. The web-based application 520 may be accessed by the mobile device 510 through an internet browser. The web-based application 520 may be configured to subscribe to web API such as a motion event web API. The web-based application 520 may also be configured to be able to receive standardized motion parameters from a motion event web API and translate them into requested movement commands for a robotic device.

Block 530 represents a motion event web API. Block 530 may also represent multiple motion event web APIs. The motion event web API 530 may normalize motion data into standardized motion parameters.

Block 540 represents a robotic device. The robotic device 540 may be configured to receive requested movement commands and execute the movement commands. The robotic device may comprise multiple components that can execute the requested movement commands such as a base, an arm, and/or a head.

Block 512 represents an indication that the mobile device 510 has accessed the web-based application 520 through an internet browser.

Block 514 represents a subscription from the web-based application 520 to the motion event web API 530.

Block 516 represents motion data that comprises tracked movements of the mobile device 510 in 3D space that is received by the motion event web API 530.

Block 518 represents standardized motion parameters normalized from motion data by the motion event web API 530 and sent to the web-based application 520.

Block 522 represents requested movement commands converted by the web-based application 520 and sent to the robotic device 540 to execute.

The information flow chart 500 starts at the mobile device 510 where, when the mobile device 510 accesses the web-based application 520, an indication 512 may be received by the web-based application 520. The web-based application 520 may then initiate a subscription 514 to a motion event web API 530. The motion event web API 530 may then receive motion data 516 from the mobile device 510 where the motion data 516 represents tracked movement of the mobile device 510 in 3D space. The motion event web API 530 may then normalize the motion data 516 into standardized motion parameters 518 such that if the motion data 516 format varies between mobile devices, the resulting standardized motion parameters 518 are in a standard format. The standardized motion parameters 518 may then be sent to the web-based application 520 where the web-based application 520 may convert the standardized motion parameters 518 into requested movement commands 522 for a robotic device 540. Finally, the web-based application 520 may then send the requested movement commands 522 to the robotic device 540 where the robotic device 540 may execute the requested movement commands 522.

Figure 5B:
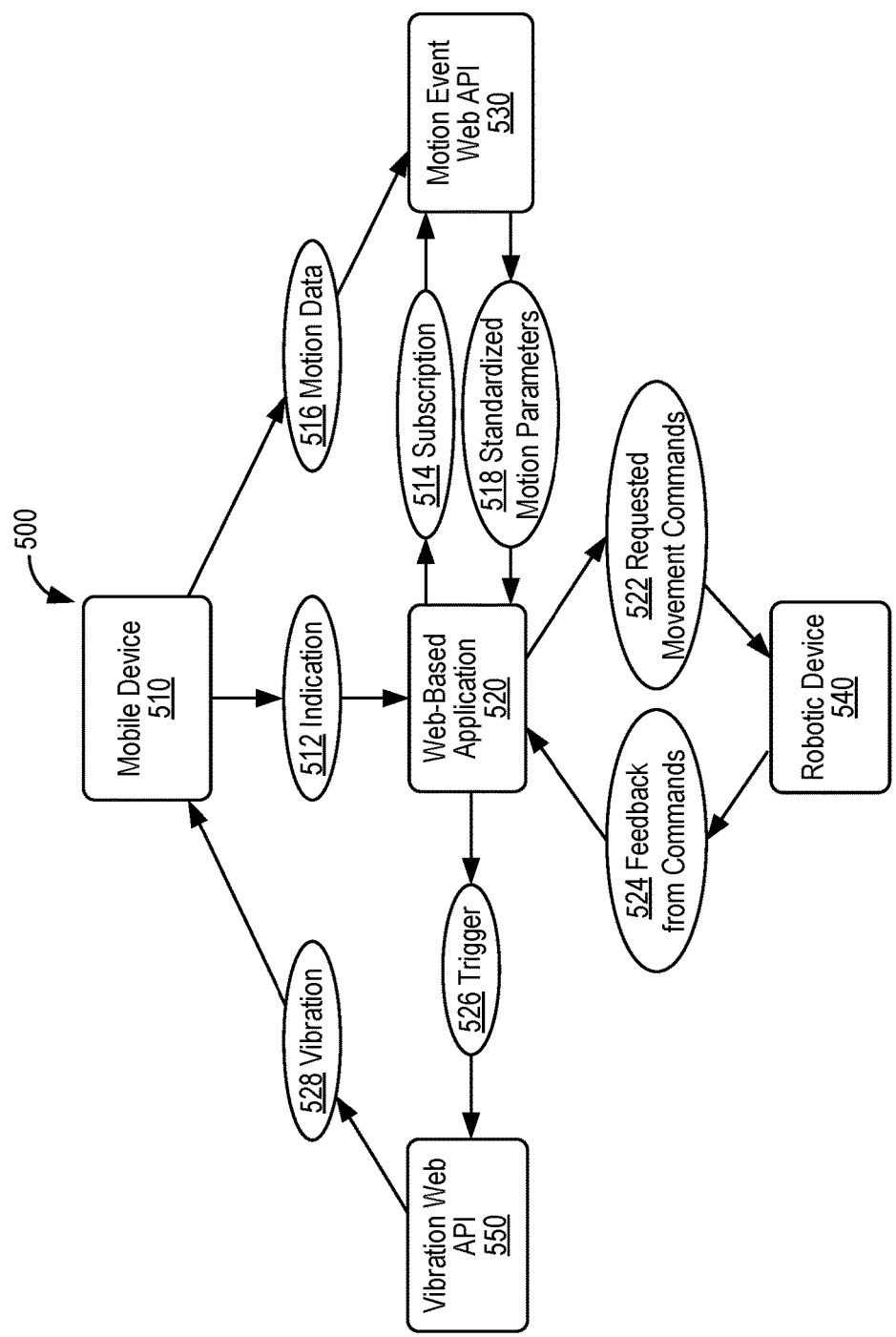
FIG. 5B illustrates an additional information flow diagram, in accordance with example embodiments.

FIG. 5B is an additional embodiment of the information flow diagram depicted in FIG. 5A, in accordance with example embodiments. More specifically, FIG. 5B illustrates an alternative variation of the example pipeline 500.

Blocks 510, 512, 514, 516, 518, 520, 522, 530, and 540 represent the same components and data types that they represented in FIG. 5A. FIG. 5B depicts additional components and data flow that may be used in addition to the blocks of FIG. 5A.

Block 550 represents a vibration web API. The vibration web API may be configured to cause a mobile device to vibrate.

Block 524 represents feedback data from robotic device 540 about the execution of the requested movement commands 522. The feedback data 524 may comprise confirmation of the execution of the requested movement commands 522. The feedback data may also comprise notifications that warn if the execution of requested movement commands 522 will fail. For example, the feedback data 524 may warn if the requested movement commands 522 are outside of the robotic device's 540 capabilities. The feedback data 524 may further include notifications that warn if the execution of requested movement commands 522 are approaching operational limits, for example, the feedback data 524 may warn if the requested movement commands 522 for the base wheels of the robotic device 540 are reaching a speed that could be dangerous for the robotic device 540 to be moving.

Block 526 represents a trigger from the web-based application 520 to the vibration web API 550 to execute a command to send a vibration to the mobile device 510.

Block 528 represents a triggered vibration from the vibration web API 550 to the mobile device 510.

Information flow diagram 500 in FIG. 5B includes the same blocks as the flow diagram in the FIG. 5A and includes additional blocks starting from robotic device 540. After the requested movement commands 522 are sent to the robotic device 540, the robotic device 540 may send feedback data 524 about the execution of the requested motion commands 522 to the web-based application 520. The feedback data 524 may include information related to the execution of requested movement commands 522, such as the success of the execution or the attempt and failure of the execution. The web-based application 520 may then send a trigger 526 to the vibration web API 550. The web-based application 520 may send the trigger 526 based on the feedback data 524. The vibration web API 550 may then trigger a vibration 528 to occur in the mobile device 510. The vibration 528 may be used as haptic feedback to the user through the mobile device 510.

Figure 6B:
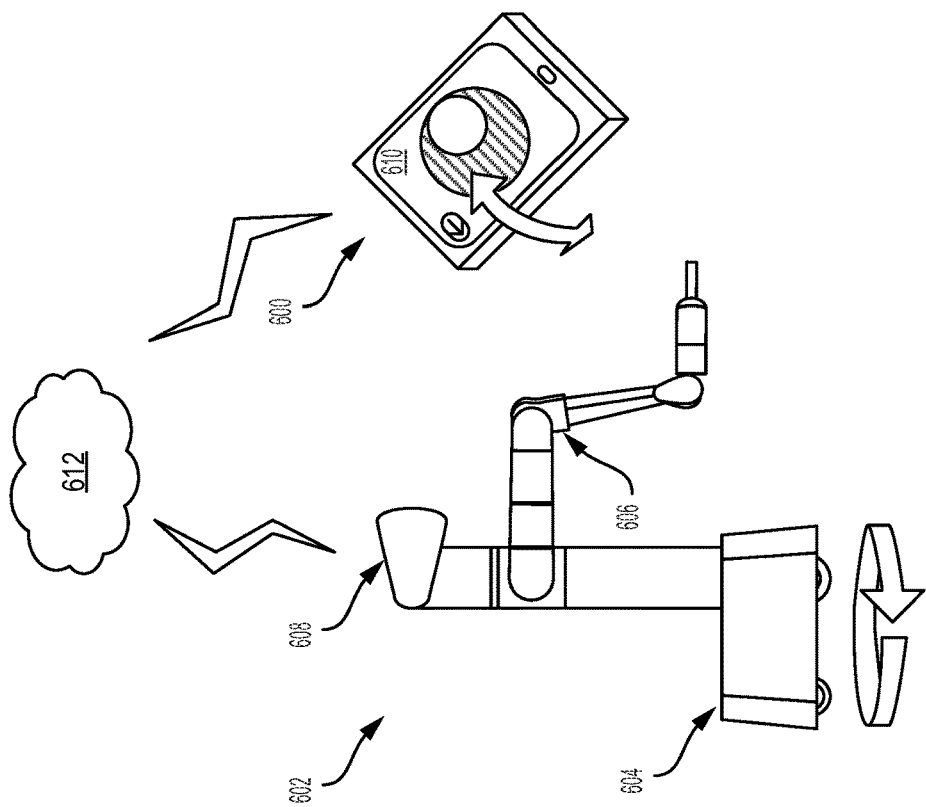
FIG. 6B illustrates a robotic device executing requested movement commands, in accordance with example embodiments.
Figure 6A:
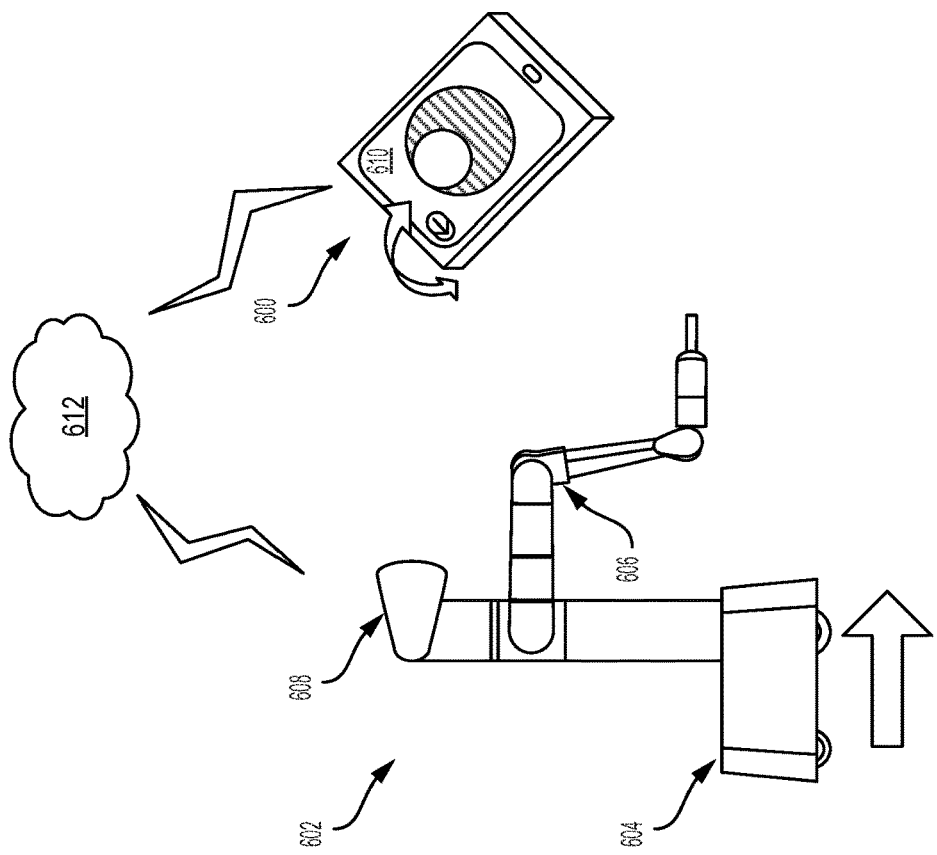
FIG. 6A illustrates a robotic device executing requested movement commands, in accordance with example embodiments.

FIGS. 6A and 6B are side views of an example robotic device and an example mobile device displaying an example web-based application user interface, in accordance with example embodiments. More specifically, robotic device 602 includes a mobile base 604, a robotic arm 606, and a head 608. The robotic device 602 may be the same or similar to the robot illustrated and described with respect to FIGS. 1-4. Mobile device 600 may comprise one or more motion sensors that detect and track movements of the mobile device 600 in 3D space. A web-based application 610 may be configured to display a user interface similar to the one in FIG. 6A when being accessed by a mobile device 600. A cloud-based web server 612 may be configured to host the web-based application 610 and facilitate communication between the robotic device 602, web-based application 610, and mobile device 600.

FIG. 6A depicts an example embodiment of a robotic device 602 executing requested movement commands. A user may access the web-based application 610 through mobile device 600. A user may then move mobile device 600 in a motion that tilts the phone forward, away from the user. This movement may be imitated in changes in the user interface of the web-based application 610, such as how the unshaded circle is positioned at the top of the shaded circle. The motion data of the mobile device's 600 movement may then be received by a motion event web API that the web-based application 610 is subscribed to. The motion event web API may then normalize the motion data into standardized motion parameters for the web-based application 610 to convert into requested movement commands. The conversion may be dependent on the type of motion the mobile device 600 was moved in and the component of the robotic device 602 that is being controlled. Once converted, the requested movement commands may be sent to the robotic device 602 by way of web server 612. The robotic device 602 may then execute the requested movement commands. The commands may be for a particular component of the robotic device 602. The example embodiment depicted in FIG. 6A shows the requested movement commands causing the wheels of the base 604 of the robotic device 602 to translate the robotic device 602 forward. In other embodiments, the requested movement commands created from the forward tilt motion of the mobile device 600 may cause the wheels of the base 604 of the robotic device 602 to move in other directions and/or rotations.

A user may also move the mobile device 600 in other motions. FIG. 6B depicts the same components as FIG. 6A with a different motion input from the user. A user may tilt the mobile device 600 to the right. This movement may also be imitated in changes in the user interface of the web-based application 610, such as how the unshaded circle is now positioned on the right side of the shaded circle. The motion data is again received by a motion event web API and normalized into standardized motion parameters for the web-based application 610 to convert into requested movement commands. The conversion for the motion of the mobile device 600 depicted in FIG. 6B may differ from the conversion for the motion of the mobile device 610 in FIG. 6A. Once converted, the requested movement commands may be sent to the robotic device 602 by way of web server 612. The robotic device 602 may then execute the requested movement commands. The example embodiment depicted in FIG. 6B shows the requested movement commands causing the wheels of the base 604 of the robotic device 602 to rotate the robotic device 602 to the right. In other embodiments, the requested movement commands created from the right tilt motion of the mobile device 600 may cause the wheels of the base 604 of the robotic device 602 to move in other directions and/or rotations.

Figure 7B:
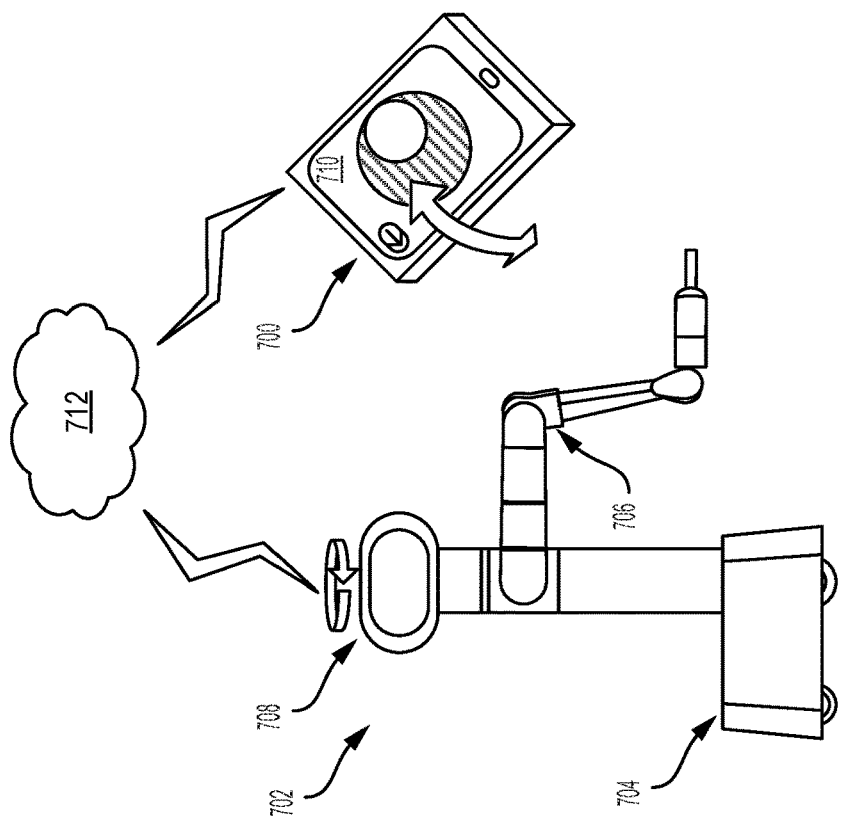
FIG. 7B illustrates a robotic device executing requested movement commands, in accordance with example embodiments.
Figure 7A:
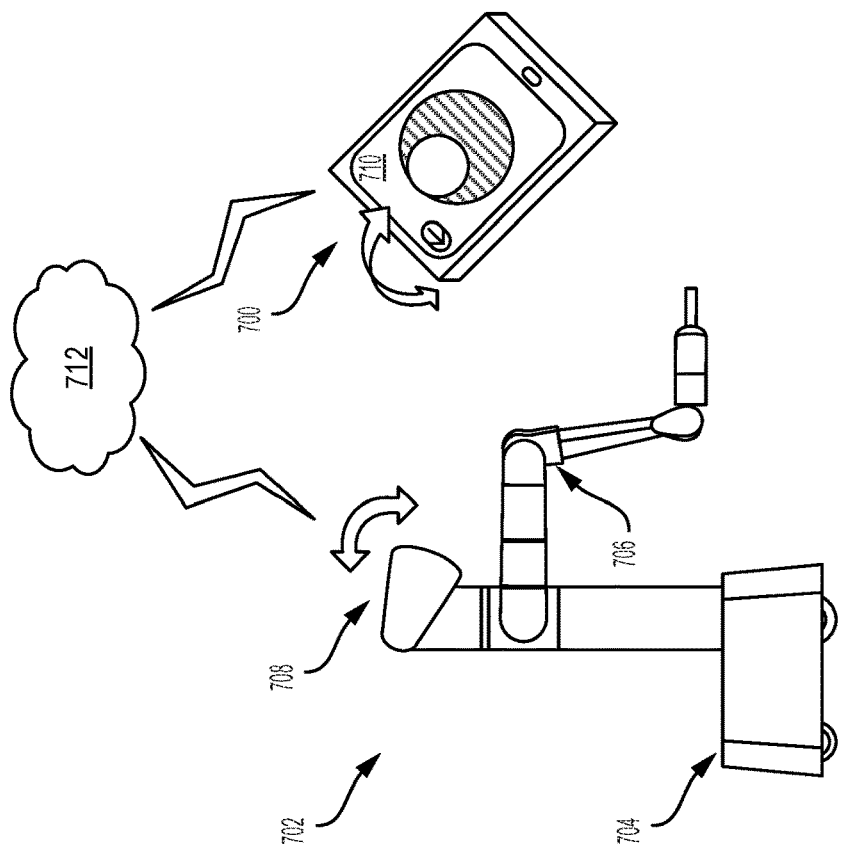
FIG. 7A illustrates a robotic device executing requested movement commands, in accordance with example embodiments.

FIGS. 7A and 7B depict similar embodiments to those in FIGS. 6A and 6B. FIGS. 7A and 7B are side views of an example robotic device and an example mobile device displaying an example web-based application user interface, in accordance with example embodiments. More specifically, robotic device 702 includes a mobile base 704, a robotic arm 706, and a head 708. The robotic device 702 may be the same or similar to the robot illustrated and described with respect to FIGS. 1-4. Mobile device 700 may comprise one or more motion sensors that detect and track movements of the mobile device 700 in 3D space. A web-based application 710 may be configured to display a user interface similar to the one in FIG. 7A when being accessed by a mobile device 700. A cloud-based web server 712 may be configured to host the web-based application 710 and facilitate communication between the robotic device 702, web-based application 710, and mobile device 700.

In some example embodiments, the robotic device 702 may have multiple components that are configured to execute requested movement commands. In addition, the web-based application 710 may be configured to convert standardized motion parameters into requested movement commands for each compatible component of the robotic device 702. In FIGS. 7A and 7B, the robotic device 702 has a movable head 708. In some embodiments, the user may select a component of the robotic device 702 they desire to control through the web-based application 710. In the embodiments of FIGS. 7A and 7B, the head component may have been selected through the web-based application.

In the example embodiment of FIG. 7A, after accessing the web-based application 710 on a mobile device 700, a user may select robotic device 702 to control. Additionally, the user may select the head component 708 to control. The user may then move mobile device 700 in a motion that tilts the phone forward, away from the user. This movement may be imitated in changes in the user interface of the web-based application 710, such as how the unshaded circle is positioned at the top of the shaded circle. The user interface may also change by updating a visual data feed as well or instead, such as updating an image to show the current view of a visual sensor. For instance, if the robot's head has a camera, the image stream from the camera may be presented in real time on a phone screen and, as the user moves the phone, the robot's head moves and the image stream updates to show what the robot is seeing. The motion data of the mobile device's 700 movement may then be received by a motion event web API that the web-based application 710 is subscribed to. The motion event web API may then normalize the motion data into standardized motion parameters for the web-based application 710 to convert into requested movement commands. The conversion the web-based application 710 applies to the standardized motion parameters may be specialized for creating requested movement commands for the head component 708. Once converted, the requested movement commands may be sent to the robotic device 702 by way of web server 712. The head component 708 of the robotic device 702 may then execute the requested movement commands. In some example embodiments, the requested movement commands created from the forward tilt motion of the mobile device 700 may cause the head component 708 to tilt forward. In other embodiments, the requested movement commands created from the forward tilt motion of the mobile device 700 may cause the head component 708 to move in other directions and/or rotations.

FIG. 7B depicts a similar embodiment to FIG. 7A, wherein the user may select robotic device 702 to control and may select the head component 708 to control. In the embodiment depicted in FIG. 7B, the user may then move mobile device 700 in a motion that tilts the phone to the right. This movement may also be imitated in changes in the user interface of the web-based application 710, such as how the unshaded circle is now positioned on the right side of the shaded circle. The user interface may also change by updating a visual data feed as well or instead, such as updating an image to show the current view of a visual sensor on the robot. The motion data is again received by a motion event web API and normalized into standardized motion parameters for the web-based application 710 to convert into requested movement commands. The conversion for the motion of the mobile device 700 depicted in FIG. 7B may differ from the conversion for the motion of the mobile device 700 in FIG. 7A. Once converted, the requested movement commands may be sent to the robotic device 702 by way of web server 712. The robotic device 702 may then execute the requested movement commands. In some example embodiments, the requested movement commands created from the right tilt motion of the mobile device 700 may cause the head component 708 to rotate to the right. In other embodiments, the requested movement commands created from the forward tilt motion of the mobile device 700 may cause the head component 708 to move in other directions and/or rotations.

In some example embodiments, the web-based application may require the user to input a code in order to authorize the mobile device and the user. FIGS. 8A, 8B, 8C, 8D, 8E, and 8F depict an example embodiment that includes functionality in order to authorize the user and the mobile device he or she is using. FIGS. 8A, 8B, 8C, 8D, 8E, and 8F are side views of an example robotic device and an example mobile device displaying an example web-based application user interface, in accordance with example embodiments. More specifically, robotic device 802 includes a mobile base 804, a robotic arm 806, and a head 808. The robotic device 802 may be the same or similar to the robot illustrated and described with respect to FIGS. 1-4. Mobile device 800 may comprise one or more motion sensors that detect and track movements of the mobile device 800 in 3D space. A web-based application 810 may be configured to display a user interface similar to the one in FIG. 8A when being accessed by a mobile device 800. A cloud-based web server 812 may be configured to host the web-based application 810 and facilitate communication between the robotic device 802, web-based application 810, and mobile device 800.

Figure 8A:
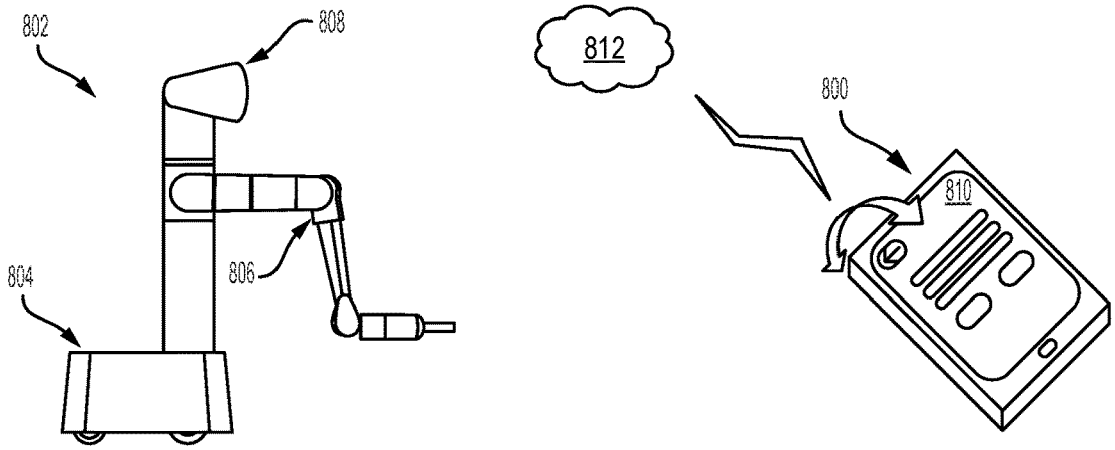
FIG. 8A illustrates a mobile device attempting to control a robotic device, in accordance with example embodiments.

FIG. 8A depicts the initial conditions of the example embodiment. A user may access the web-based application 810 through an internet browser of a mobile device 800. The user may move the mobile device in any motion, such as the tilting motion shown in FIG. 8A, and the motion data may be received by the motion event web API. However the robotic device 802 will not move in response.

Figure 8B:
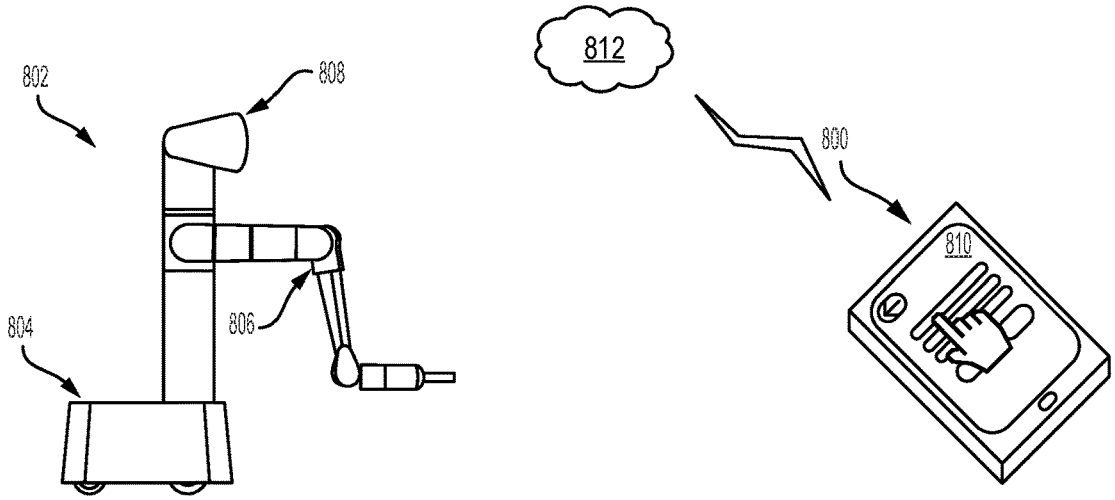
FIG. 8B illustrates a user selecting a robotic device through a web-based application, in accordance with example embodiments.

FIG. 8B illustrates a possible next step in the authorization process. The user may use the user interface of the web-based application 810 to select the robotic device they want to control. The possible robotic devices that are available to be controlled may be represented by a list of associated identifiers. The user may select the robotic device they want to control from the list of associated identifiers.

Figure 8C:
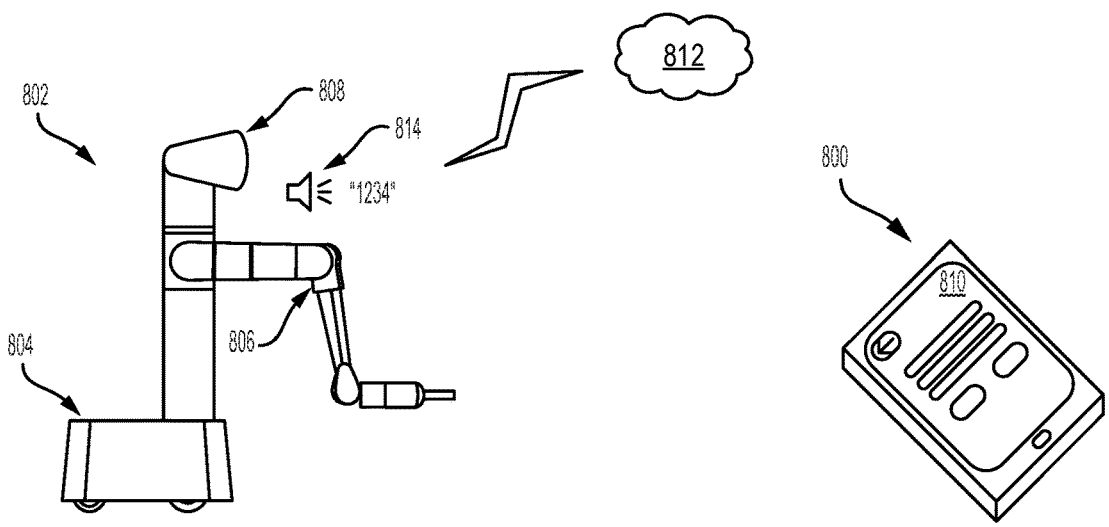
FIG. 8C illustrates a robotic device outputting a numeric code, in accordance with example embodiments.

FIG. 8C illustrates another possible next step in the authorization process. The web-based application 810 may cause the selected robotic device to output an identification code. The identification code may be comprised of alphanumeric characters. The code may be outputted through an auditory device such as a speaker associated with a robotic device. The code may also be outputted by a visual display such as a screen on the robotic device as well or instead.

Figure 8D:
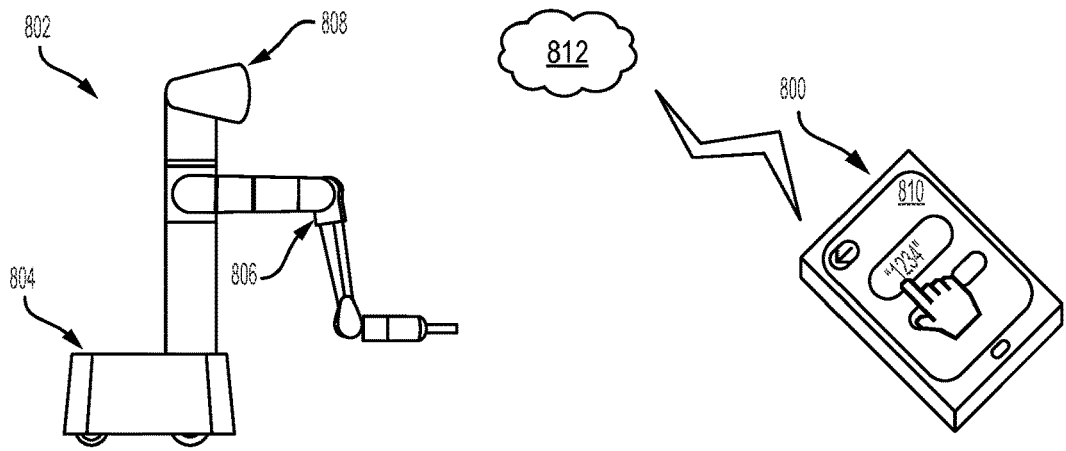
FIG. 8D illustrates a user inputting a numeric code into a web-based application, in accordance with example embodiments.

FIG. 8D illustrates another possible next step in the authorization process. The web-based application 810 may provide an interface to input the identification code that was outputted by the robotic device 802. The interface may take the form of a textbox the user can type the unique code into. The user may input a code into the web-based application 810. Then the web-based application 810 may verify the inputted code matches the identification code the robotic device 802 outputted. Once the verification is successful, the web-based application 810 may authorize the mobile device 800 to control the robotic device 802.

Figure 8E:
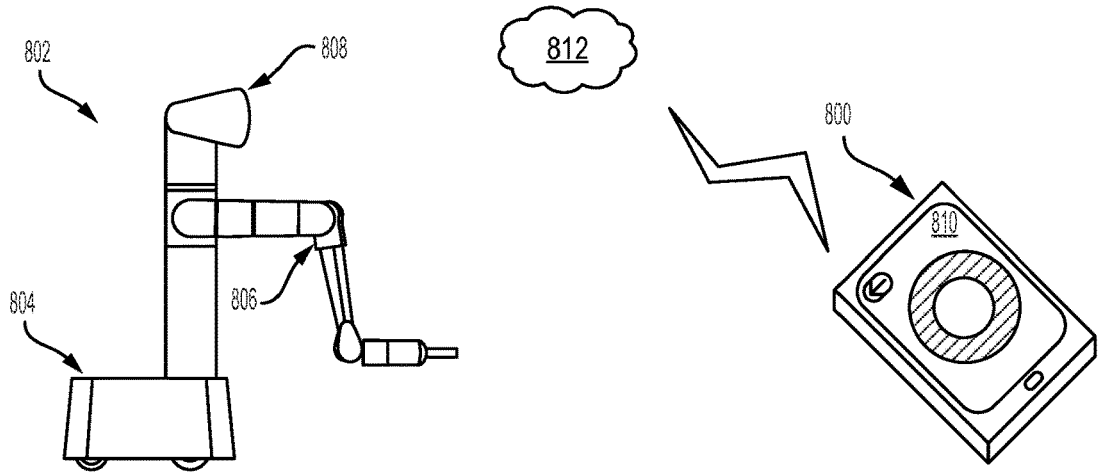
FIG. 8E illustrates a web-based application authorizing a mobile device for control of a robotic device, in accordance with example embodiments.

FIG. 8E illustrates another possible next step in the authorization process. Once the mobile device 800 is authorized, the web-based application's 810 user interface may change to indicate that the robotic device may now be controlled from the mobile device 800, such as depicted in FIG. 8E. In other embodiments, where there may be more than one component that can be controlled on or in the robotic device 802, a list of identifiers associated with each component may be displayed on the user interface of the web-based application 810 for the user to select which component they wish to control. For example, the robotic device 802 may have a base 804, an arm 806, and a head 808. In an example embodiment that controls that robotic device 802, the user interface may display a list with the selectable options of: "arm", "base", and "head."

Figure 8F:
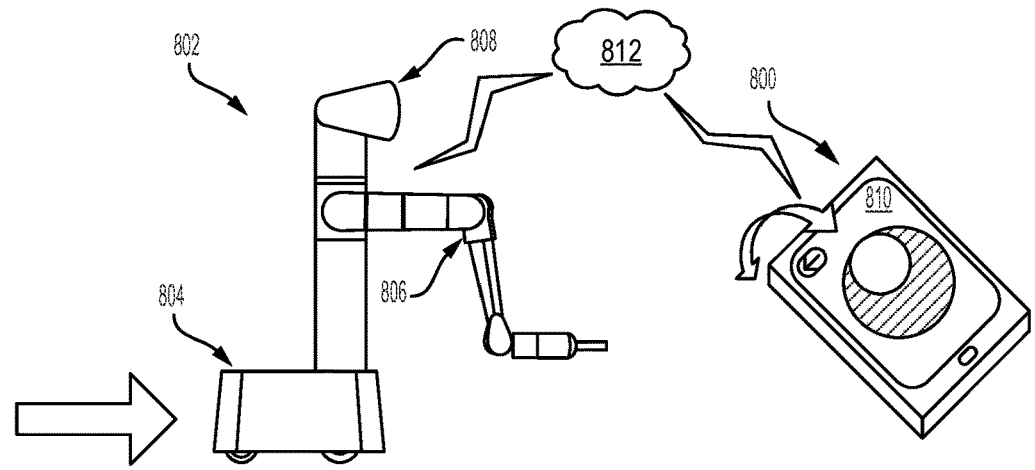
FIG. 8F illustrates a robotic device executing requested movement commands, in accordance with example embodiments.

FIG. 8F illustrates another possible next step in the authorization process. Once the mobile device 800 is ready to control the robotic device 802, or a selected component of the robotic device 802, the subsequent movements the user inputs with the mobile device 800 may be received, via a web-hosted server 812, as motion data by a motion event web API that the web-based application 810 is subscribed to. The motion data may be then normalized into standardized motion parameters by the motion event web API. The standardized motion parameters may be received by the web-based application 810, where the web-based application 810 may then convert the standardized motion parameters into requested movement commands for what robotic device 802 and/or component is being controlled respectively. The requested movement commands may then be sent, via the web-hosted server 812, to the robotic device 802. The robotic device 802 may then execute the requested movement commands. The example embodiment depicted in FIG. 8F shows the requested movement commands causing the wheels of the base 804 of the robotic device 802 to translate the robotic device forward.

Figure 9:
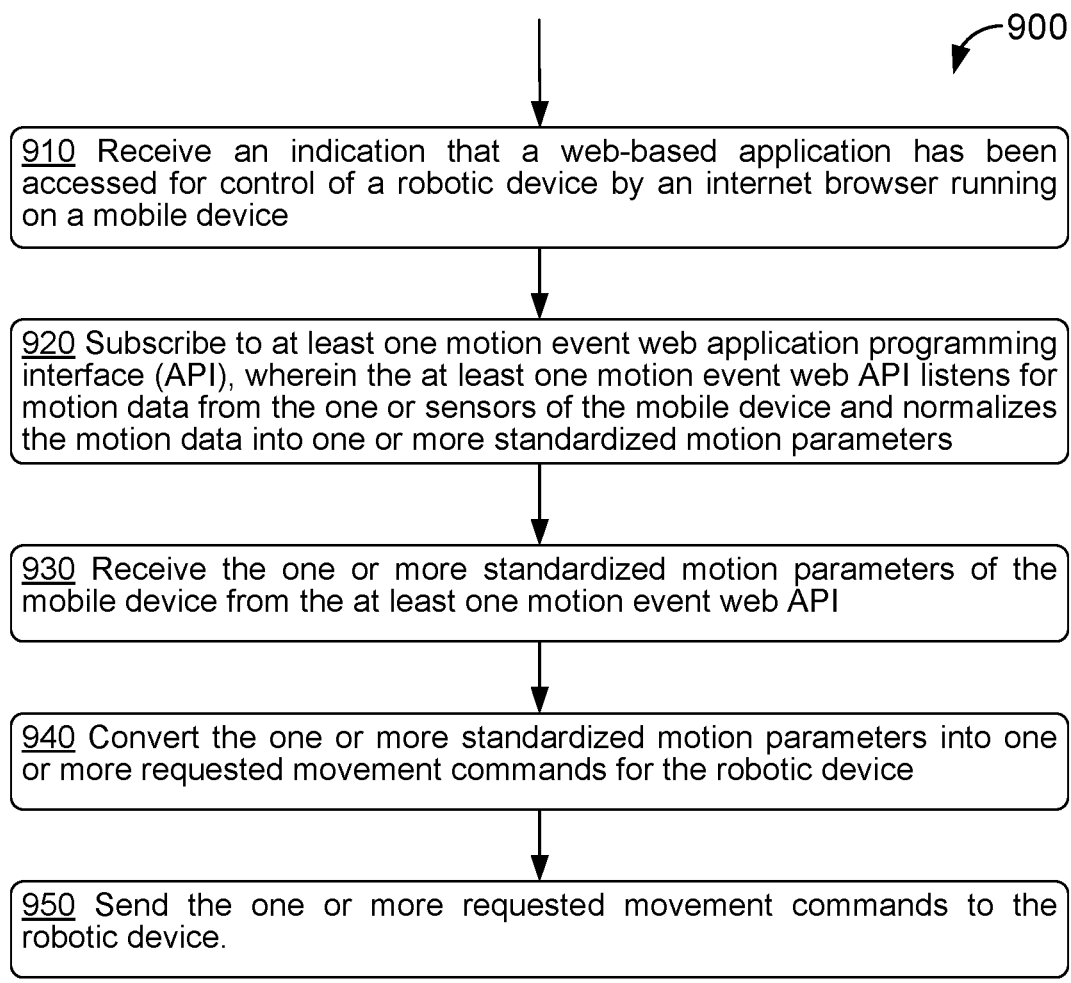
FIG. 9 illustrates a block diagram of a method, in accordance with example embodiments.

FIG. 9 is a block diagram of a method, in accordance with example embodiments. In some examples, method 900 of FIG. 9 may be carried out by one or more computing devices, such as a cloud-based server system. Execution of method 900 may involve a robotic device, such as illustrated and described with respect to FIGS. 1-4. Other robotic devices may also be used in the performance of method 900. Execution of method 900 may also involve a mobile device, such as a mobile phone. In further examples, some or all of the blocks of method 900 may be performed by a control system local to the robotic device and/or by the mobile device.

At block 910, method 900 includes, receiving an indication that a web-based application has been accessed for control of a robotic device by an internet browser running on a mobile device. More specifically, a web-based application may receive an indication that the web-based application has been accessed for control of a robotic device by an internet browser running on a mobile device, where the mobile device comprises one or more sensors to detect movement of the mobile device. The indication may be sent when a user accesses the web-based application through the internet browser of a mobile device.

In some examples, after receiving the indication, the web-based application may cause the robotic device to output a code. The web-based application may receive an indication that the user has inputted the code into the web-based application. The web-based application may then authorize the mobile device for control of the robotic device.

In some embodiments, there may be more than one robotic device available and configured to receive requested movement commands. In these embodiments, the web-based application may display a list of selectable robotic device identifiers that are associated with a plurality of robotic devices, wherein the web-based application is configured to translate standardized motion parameters into requested movement commands for each of the plurality of robotic devices.

In some embodiments, the robotic device that has been selected to be controlled may comprise of one or more components that are configured to receive and execute requested movement commands. In these embodiments, the web-based application may display a list of selectable component identifiers that are associated with one or more components of the robotic device, wherein the web-based application is configured to translate standardized motion parameters into requested movement commands for each of the one or more components of a robotic device.

In further embodiments, the one or more components of the robotic device comprises at least a base, an arm, and a head.

At block 920, method 900 includes subscribing to at least one motion event web application programming interface (API), where the at least one motion event web API listens for motion data from the one or more sensors of the mobile device and normalizes the motion data into one or more standardized motion parameters. More specifically, after receiving the indication, a web-based application may subscribe to at least one motion event web application programming interface (API), wherein the at least one motion event web API listens for motion data from the one or more sensors of the mobile device and normalizes the motion data into one or more standardized motion parameters.

At block 930, method 900 includes receiving the one or more standardized motion parameters of the mobile device from the motion event web API. More specifically, when a motion event is detected by the at least one motion event web API, a web-based application may receive the one or more standardized motion parameters of the mobile device from the at least one motion event web API.

At block 940, method 900 includes converting the one or more standardized motion parameters into one or more requested movement commands for the robotic device. More specifically, a web-based application may convert the one or more standardized motion parameters into one or more requested movement commands for the robotic device.

At block 950, method 900 includes sending the one or more requested movement commands to the robotic device. More specifically, the web-based application may send the one or more requested movement commands to the robotic device.

In further embodiments, the method may further include receiving feedback from the robotic device that at least one of the one or more requested movement commands could not be executed. In response to receiving the feedback, the method may include triggering a vibration web API to cause the mobile device to vibrate.

In further embodiments, sending the one or more requested movement commands to the robotic device is triggered by a touch-based user input to the mobile device, where the touch-based user input may comprise a press-and-hold actuation that allows the web-based application to send the requested movement commands to the robotic device, and where releasing the press-and-hold actuation stops subsequent requested movement commands from being sent to the robotic device.

In further embodiments, sending, by the web-based application, the one or more requested movement commands to the robotic device may comprise sending the one or more requested movement commands to cloud-hosted data storage, where the robotic device is configured to receive the one or more requested movement commands from the cloud-hosted data storage. In other embodiments, sending, by the web-based application, the one or more requested movement commands to the robotic device may comprise sending the one or more requested movement commands through a Web Socket connection protocol to the robotic device.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving an indication that a web-based application has been accessed for control of a robotic device by an internet browser running on a mobile device, wherein the mobile device comprises one or more sensors to detect movement of the mobile device, and wherein the robotic device comprises a plurality of types of components;
   after receiving the indication, causing the web-based application to display a list of selectable component identifiers that are associated with one or more types of components of the plurality of types of components of the robotic device;
   receiving, at the web-based application, a selected component identifier corresponding to a type of a selected component of the robotic device to be controlled;
   subscribing the web-based application to at least one motion event web application programming interface (API), wherein the at least one motion event web API listens for motion data from the one or more sensors of the mobile device and normalizes the motion data into one or more standardized motion parameters;
   when a motion event is detected by the at least one motion event web API, receiving, by the web-based application, the one or more standardized motion parameters of the mobile device from the at least one motion event web API;
   converting, by the web-based application, the one or more standardized motion parameters into one or more requested movement commands for the robotic device, wherein the one or more requested movement commands for the robotic device are dependent on a type of the selected component of the robotic device; and
   sending, by the web-based application, the one or more requested movement commands to the robotic device, wherein sending, by the web-based application, the one or more requested movement commands to the robotic device comprises:
   sending the one or more requested movement commands to cloud-hosted data storage, wherein the robotic device is configured to receive the one or more requested movement commands from the cloud-hosted data storage.

2. The method of claim 1, wherein the at least one motion event web API comprises at least a first motion event web API that reads orientation of the mobile device and a second motion event web API that reads acceleration of the mobile device.

3. The method of claim 1, further comprising:
   after receiving the indication, causing the robotic device to output a code;
   receiving a further indication that the code has been inputted into the web-based application; and
   after receiving the further indication, authorizing the mobile device for control of the robotic device.

4. The method of claim 1, further comprising causing the web-based application to display a list of selectable robotic device identifiers that are associated with a plurality of robotic devices, wherein the web-based application is configured to convert standardized motion parameters into requested movement commands for each of the plurality of robotic devices.

5. The method of claim 1, wherein the one or more types of components of the robotic device comprise at least a base, an arm, and a head.

6. The method of claim 1, wherein sending the one or more requested movement commands to the robotic device is triggered by a touch-based user input to the mobile device, wherein the touch-based user input comprises a press-and-hold actuation that allows the web-based application to send the requested movement commands to the robotic device, and wherein releasing the press-and-hold actuation stops subsequent requested movement commands from being sent to the robotic device.

7. The method of claim 1, wherein sending, by the web-based application, the one or more requested movement commands to the robotic device comprises:
 sending the one or more requested movement commands through a Web Socket connection protocol to the robotic device.

8. The method of claim 1, further comprising:
 receiving feedback from the robotic device that at least one of the one or more requested movement commands could not be executed; and
 in response to receiving the feedback, triggering a vibration web API to cause the mobile device to vibrate.

9. A system, comprising:
 a robotic device, comprising:
  a control system configured to receive requested movement commands; and
  one or more components configured to execute the requested movement commands; and
 a web-based application configured to:
  receive an indication that the web-based application has been accessed for control of the robotic device by an internet browser running on a mobile device, wherein the mobile device comprises one or more sensors to detect movement of the mobile device, and wherein the robotic device comprises a plurality of types of components;
  after receiving the indication, cause the web-based application to display a list of selectable component identifiers that are associated with one or more types of components of the plurality of types of components of the robotic device;
  receive a selected component identifier corresponding to a type of a selected component of the robotic device to be controlled;
  subscribe the web-based application to at least one motion event web application programming interface (API), wherein the at least one motion event web API listens for motion data from the one or more sensors of the mobile device and normalizes the motion data into one or more standardized motion parameters;
  when a motion event is detected by the at least one motion event web API, receive the one or more standardized motion parameters of the mobile device from the at least one motion event web API;
  convert the one or more standardized motion parameters into one or more requested movement commands for the robotic device, wherein the one or more requested movement commands for the robotic device are dependent on the type of the selected component of the robotic device; and
  send the one or more requested movement commands to the robotic device, wherein sending the one or more requested movement commands to the robotic device comprises:
   sending the one or more requested movement commands to cloud-hosted data storage, wherein the robotic device is configured to receive the one or more requested movement commands from the cloud-hosted data storage.

10. The system of claim 9, wherein the system further comprises:
 the mobile device comprising:
  the internet browser, wherein the internet browser is configured to access the web-based application; and
  the one or more motion sensors configured to detect the movement of the mobile device.

11. The system of claim 9, wherein the web-based application is further configured to:
 after receiving the indication, cause the robotic device to output a code;
 receive a further indication that the code has been inputted into the web-based application; and
 after receiving the further indication, authorize the mobile device for control of the robotic device.

12. The system of claim 9, further comprising a plurality of robotic devices, wherein the web-based application is further configured to display a list of selectable robotic device identifiers that are associated with the plurality of robotic devices, wherein the web-based application is configured to convert standardized motion parameters into requested movement commands for each of the plurality of robotic devices.

13. The system of claim 9, wherein:
 the one or more types of components of the robotic device are configured to receive and execute requested movement commands.

14. The system of claim 9, wherein the one or more types of components of the robotic device comprise at least a base, an arm, and a head.

15. The system of claim 9, wherein the web-based application is configured to send the one or more requested movement commands to the robotic device responsive to a touch-based user input to the mobile device, wherein the touch-based user input comprises a press-and-hold actuation that allows the web-based application to send the requested movement commands to the robotic device, and wherein releasing the press-and-hold actuation stops subsequent requested movement commands from being sent to the robotic device.

16. The system of claim 9, wherein the web-based application is configured to send the one or more requested movement commands to the robotic device by:
 sending the one or more requested movement commands through a Web Socket connection protocol to the robotic device.

17. A non-transitory computer readable medium comprising program instructions executable by at least one processor to cause the at least processor to perform functions comprising:
 receiving an indication that a web-based application has been accessed for control of a robotic device by an internet browser running on a mobile device, wherein the mobile device comprises one or more sensors to detect movement of the mobile device, and wherein the robotic device comprises a plurality of types of components;
 after receiving the indication, causing the web-based application to display a list of selectable component identifiers that are associated with one or more types of components of the plurality of types of components of the robotic device;

receiving, at the web-based application, a selected component identifier corresponding to a type of a selected component of the robotic device to be controlled;

subscribing the web-based application to a motion event web application programming interface (API), wherein the motion event web API listens for motion data from the one or more sensors of the mobile device and normalizes the motion data into one or more standardized motion parameters;

when a motion event is detected by the motion event web API, receiving, by the web-based application, the one or more standardized motion parameters of the mobile device from the motion event web API;

converting, by the web-based application, the one or more standardized motion parameters into one or more requested movement commands for the robotic device, wherein the one or more requested movement commands for the robotic device are dependent on a type of the selected component of the robotic device; and sending, by the web-based application, the one or more requested movement commands to the robotic device, wherein sending, by the web-based application, the one or more requested movement commands to the robotic device comprises:

sending the one or more requested movement commands to cloud-hosted data storage, wherein the robotic device is configured to receive the one or more requested movement commands from the cloud-hosted data storage.

18. The method of claim 5, wherein the selected component identifier corresponds to the base of the robotic device, and wherein converting the one or more standardized motion parameters into the one or more requested movement commands for the robotic device is dependent on the type of the selected component being the base of the robotic device.

19. The method of claim 5, wherein the selected component identifier corresponds to the arm of the robotic device, and wherein converting the one or more standardized motion parameters into the one or more requested movement commands for the robotic device is dependent on the type of the selected component being the arm of the robotic device.

20. The method of claim 5, wherein the selected component identifier corresponds to the head of the robotic device, and wherein converting the one or more standardized motion parameters into the one or more requested movement commands for the robotic device is dependent on the type of the selected component being the head of the robotic device.

* * * * *